Jan. 30, 1968 D. S. BRAINARD 3,365,909
EVAPORATIVE COOLING DEVICE BLEED WATER ARRANGEMENT
Filed June 15, 1966
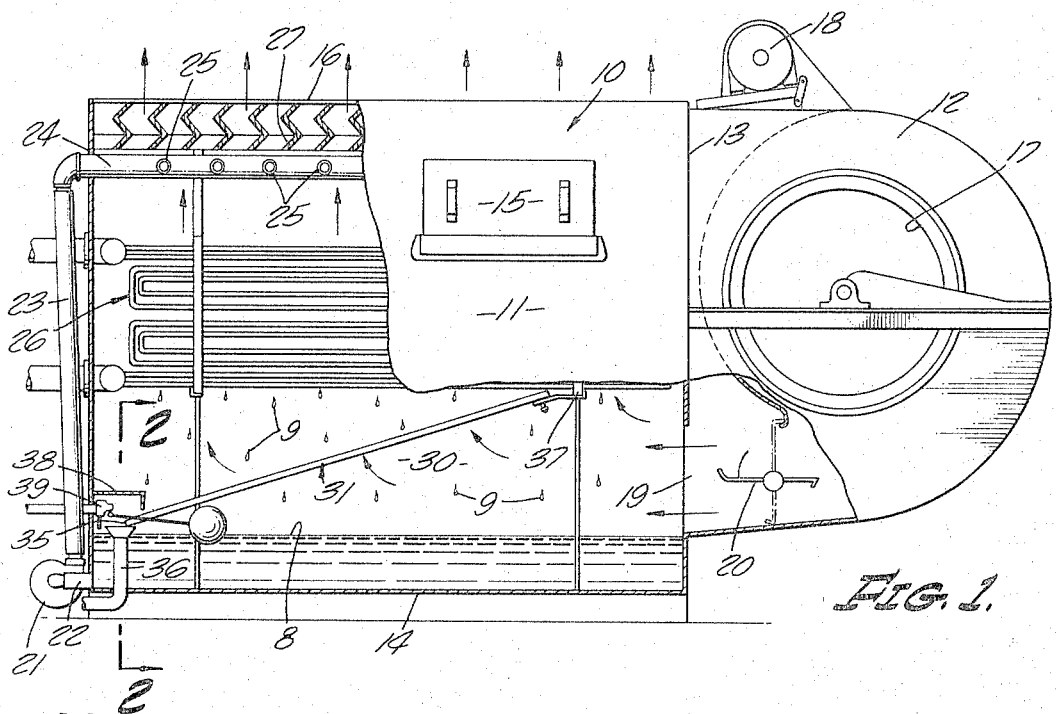
FIG. 1.
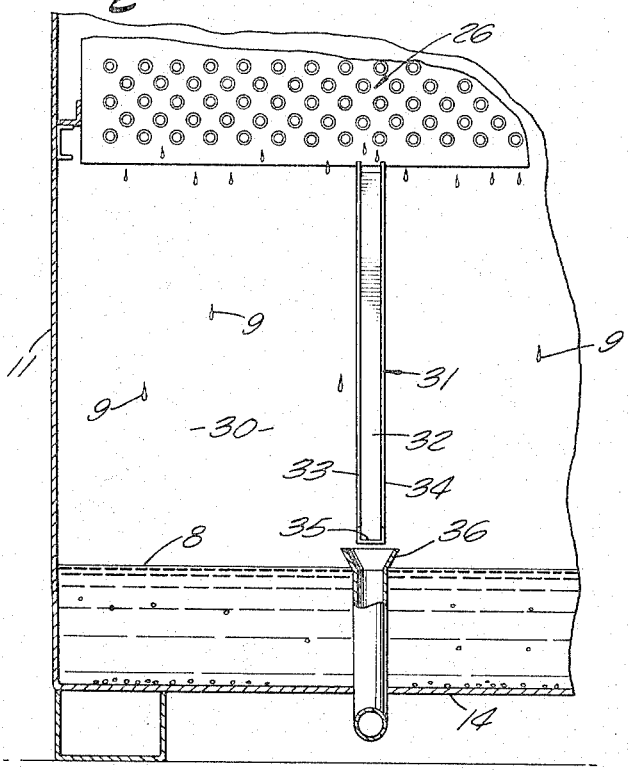
FIG. 2.
FIG. 3.
DAVID S. BRAINARD
INVENTOR.
BY Lyon & Lyon
ATTORNEYS

United States Patent Office 3,365,909
Patented Jan. 30, 1968

3,365,909
EVAPORATIVE COOLING DEVICE BLEED
WATER ARRANGEMENT
David S. Brainard, Alhambra, Calif., assignor to Borg-Warner Corporation, Chicago, Ill., a corporation of Illinois
Filed June 15, 1966, Ser. No. 557,743
11 Claims. (Cl. 62—305)

ABSTRACT OF THE DISCLOSURE

An evaporative cooling apparatus employing recirculated water sprayed over heat exchange coils and having a narrow trough extending substantially the full length of the coils in one direction and therebelow to continually catch and drain off a representative small portion of water with a high mineral concentration which is replaced by fresh water to maintain a maximum predetermined level of mineral concentration in the recirculating water.

---

This invention relates to an arrangement for accomplishing a consistent predetermined rate of removal of a portion of the spray water used in an evaporative cooling device in order to compensate for evaporation thereby maintaining the mineral concentration in the water at an acceptable level. In particular this invention relates to forced draft type evaporative cooling devices wherein the required air flow is varied over a wide range of velocities and flow patterns causing difficulty in controlling the rate of bleed water removal with heretofore conventional arrangements.

In evaporative cooling devices such as cooling towers, condensers and water coolers, air is circulated through the device and water is sprayed in the path of such air causing evaporation and resultant cooling. The sprayed water that is not evaporated is collected and recirculated for again spraying into the path of flowing air. The evaporation of some of the water of course results in an increased concentration of minerals in the unevaporated water. In order to continue operating the device, additional fresh water must be added to replace the evaporated water and this adds further minerals to the circulating water although the immediate effect is to dilute the concentration of minerals due to the lower concentration in the fresh water.

Thus it has been a recognized practice and advantage to continually remove or bleed-off some of the circulating water whereby the mineral concentration will be stabilized at an acceptable level through the addition of the fresh water having a lower mineral concentration. Substantial difficulty arises in attempting to properly control the rate of bleed water removed under all operating conditions particularly in the environment involved without incurring excessive expense. These difficulties are particularly acute in forced draft type evaporative cooling devices wherein the rate of air flow is varied in accordance with atmospheric conditions and required cooling. Moreover the high rate of air flow through the evaporative cooling device creates air flow patterns and turbulence which greatly influence the spray water flow pattern. Thus various heretofore conventional bleed water devices employing catch funnels of a particular size and shape for catching and removing a certain portion of the spray water have been found to be unsatisfactory due to the extreme variation in bleed water rate produced under varying conditions. Such funnels are usually centrally located in the device but such location is not representative under all flow conditions. Further, other conventional devices which have attempted to employ drain orifices of a predetermined size for accomplishing a predetermined bleed rate are unsatisfactory in most situations due to the accumulation of scale, slime, or the like which partially or totally obstructs the delicately sized bleed orifice.

It is therefore a principal object of this invention to provide a novel bleed water arrangement in an evaporative cooling device employing a strategically located and sized trough which produces a substantially constant rate of bleed water removal under all conditions of operation and is adapted to operate continuously without maintenance.

Another object of this invention is to provide a novel form of bleed water removal arrangement for a forced draft type evaporative cooling device wherein a trough is positioned to receive a sample of spray water from the entire spectrum of variations of air and spray water flow encountered under all operating conditions of the device.

A further object of this invention is to provide a bleed water catch trough which extends in the direction of air flow for the entire distance beneath the spray water but is inclined downwardly away from such incoming air flow to prevent the bleed water accumulated by the trough from being dislodged from the trough. Still a further object is to provide such a trough which is relatively narrow whereby it presents only a barely perceptible obstruction to air flow through the device.

Other and more detailed objects and advantages of this invention will appear from the following description and the accompanying drawings, wherein:

FIGURE 1 is an elevation view of an evaporative cooling device with portions broken away to illustrate the arrangement of this invention and the air flow pattern through the device.

FIGURE 2 is an enlarged fragmentary sectional view taken substantially on the line 2—2 shown in FIGURE 1.

FIGURE 3 is a fragmentary perspective view of a typical through which may be used in this invention.

Referring in detail to the drawings, the evaporative cooling device, generally designated 10, illustrated in the drawings is more particularly identified as a forced draft type evaporative condenser although it will readily appear to those skilled in the art that by substituting appropriate components which are unrelated to this invention, the device 10 can be adapted to perform as a cooling tower or the like. The device 10 includes a generaly rectangular housing 11 on which is mounted a blower 12 at one end 13. The housing 11 is closed on the bottom 14 and all four sides although access doors 15 may be provided as desired. The top 16 of housing 11 is open and forms the outlet for the circulated air.

The blower 12 has intakes 17 on the sides and is driven by a motor 18. An inlet opening 19 in the end of housing 11 extends substantially across the width of the housing and communicates directly with the discharge of the blower 12. In most installations, at least where excessive cooling is undesirable, a damper 20 is provided on the blower 12 at its outlet and is adapted to pivotally modulate as shown by the arrow between a full open position as shown in solid lines and a full closed position as shown in phantom lines. In the full closed position of damper 20 no air flow is required and therefore motor 18 is stopped. The damper 20 serves to control the rate of air flow through the device 10 thereby controlling the rate of cooling accomplished. The position of the damper 20 may be automatically controlled by a damper motor (not shown) responsive to any desired characteristic such as the temperature of the water in the sump of housing 11 or the head pressure of the condenser.

The water spray for evaporative cooling may be accomplished by any convenient means such as a pump 21 having a suction line 22 connected at the water collection sump or bottom 14 of the housing for circulating the water from the housing sump through riser conduit 23 to a header 24. A plurality of branch conduits 25 having spray nozzles extend outwardly from header 24 for producing a downwardly directed spray throughout the interior of the housing 11. The heat exchanger means such as the tube bundle 26 occupies a complete horizontal zone of housing 11 immediately below the spray water header and nozzles whereby the spray water migrates over the surface of the tubes in its passage toward the sump at the bottom of the housing. The counter-flow of downwardly flowing spray water and upwardly flowing air accomplishes the cooling and causes the evaporation. The open top outlet 16 of the housing 11 is provided with conventional eliminators 27 for minimizing the discharge of spray water from the device by the upwardly flowing air.

A substantial space or horizontal zone 30 is provided between the lower most portion of the heat exchange tube bundle 26 and the water lever 8 in the sump of the housing. This zone 30 communicates directly with the inlet opening 19 from the blower and serves to distribute the air flow along the length of the housing as evenly as possible, whereby a relatively uniform upward air flow through the tube bundle 26 is accomplished. However it is readily apparent that due to the required change in air flow direction from horizontal to upward and since the air enters from one end, the air flow pattern in zone 30 will vary substantially from that inlet end to the opposite end of the housing. Moreover, as the cooling requirements vary whereby the position of damper 20 is modulated, the air flow pattern within zone 30 from end to end will further change in a disproportionate manner. As a direct result of these changing air flow patterns, the pattern in which the droplets of water 9 will fall from the tube bundle 26 is also varied to a substantial degree. Since the droplets 9 are of the highest mineral concentration of any water within the system due to their having just experienced the evaporation phase, it is this water that is most desirably removed as bleed water for accomplishing the greatest reduction in mineral content for a minimum volume of fluid loss. However these extreme variations in air flow patterns and the patterns of falling droplets 9 has made the use of normal catch funnels and basins completely impractical. For example a heretofore conventional bleed water arrangement employed a wide mouth funnel centrally located in the bottom of housing 11 having a calculated area facing upwardly to catch a calculated proportion of the droplets 9 for draining off as bleed water. However as the air flow pattern varied in zone 30 the actual proportion of droplets 9 caught by such funnel varied substantially from the calculated desired proportion. Moreover, the turbulent air flow within zone 30 often had a tendency to blow the water out of such funnel arrangement.

By this invention means are provided in the zone 30 for catching and removing a substantially constant proportion of the water droplets 9 regardless of the air flow pattern in zone 30 and, as shown in the drawings, these means may include the trough 31. The trough 31 may be of any convenient cross-section such as that shown in FIGURE 3 wherein a bottom portion 32 and side portions 33 and 34 combine to form a channel. The trough 31 is mounted in zone 30 to extend from near one end of the housing 11 to the other end in the longitudinal direction of air flow. The trough 31 may be centered laterally or positioned toward one side or the other as may be convenient for mounting and such will not adversely affect the operation. The trough 31 is inclined downwardly in the longitudinal direction of incoming air flow and to the maximum degree permitted by the size of zone 30. The lower end 35 of trough 31 is positioned immediately over a funnel-mouthed pipe 36 which serves as a waste water drain and an overflow to maintain a maximum height of water level 8. In the embodiment shown the trough 31 is most conveniently attached at its upper end at the tube sheet 37 which is spaced a sort distance from the housing end wall having inlet 19 but still the trough 31 extends a substantial proportion of the length of the housing. As thus positioned, the trough 31 in affect samples the pattern of falling water droplets 9 from one end of the housing to the other for a given lateral width corresponding to the width of the trough. As previously mentioned, the air flow pattern varies substantially along the longitudinal length of air flow but the air flow pattern at any given time is relatively uniform laterally across the housing and therefore the trough 31 does in fact sample a representative cross-section of the entire falling water droplet pattern. The trough 31 is inclined away from the incoming air flow whereby the water caught in the trough will not be blown therefrom by such air flow. In certain embodiments of the evaporative cooling device 10 the air flow patterns become so violent as to tend to blow the water out of funnel-mouth drain 36 as it passes from trough 31 and it is necessary to provide a shield 38 thereabove although this is not required in all embodiments. The water removed by both evaporation and the trough 31 is replenished by a conventional float operated supply valve 39 maintaining the nominal water level 8 desired.

The width of trough 31 is selected on the basis of both the bleed water rate desired and the particular operational characteristics of the evaporative cooling device 10. The size of the housing 11 of course is a factor but of equal importance is the cooling capacity of the unit since this will determine the amount of evaporation. Normally a bleed rate of approximately one-half the rate of evaporation is desired whereby the mineral concentration in the circulating water is maintained at an acceptable level. In any event, trough 31 is relatively narrow in comparison with the lateral width of the housing 11 whereby it forms virtually no obstruction to the flow of air in zone 30. By way of example without intent to limit applicant's invention, a typical evaporative condenser 10 having approximately a two-million B.t.u.h. rating with a housing approximately six feet high by five feet wide by eight feet long was found to need a trough 31 approximately 1⅝ inch wide which is a relatively small proportion (less than 4%) of the five foot housing width. Other embodiments have been found to require a trough of lateral width up to 6% of the housing width or as little as 3% of the housing width, depending in part on the convenient length of trough that may be mounted in the housing.

Having fully described my invention it is to be understood that I do not wish to be limited to the details herein set forth but rather my invention is of the full scope of the appended claims.

I claim:

1. In a bleed water arrangement for an evaporative cooling device having a heat exchange zone spaced above a water collection sump, comprising, a trough mounted within said device beneath the zone of heat exchange and above the sump for collection of water, said trough open upwardly and inclined for catching and draining water, said trough extending longitudinally for substantially the entire zone of heat exchange, said trough having a narrow lateral width in comparison with the lateral width of both the heat exchange zone and the water collection sump, and a drain outlet at the lower end of said trough for receiving the water from said trough.

2. In a bleed water arrangement for a forced draft evaporative cooling device having a longitudinally varying air flow pattern in a zone between water dispersal and collection, comprising, a trough mounted within said device in the zone between dispersal and collection of water and above the level of collected water, said trough open upwardly catching water, said trough extending in the general longitudinal direction for substantially the entire length of the device beneath the water dispersal, said trough inclined downwardly away from the air flow, said trough having a narrow lateral width in comparison with the lateral width of the device, and a drain outlet from the device at the lower end of said trough.

3. In a bleed water arrangement for an evaporative cooling device having an air inlet on one end of the device, comprising, an inclined trough mounted within said device in the path of incoming air, said trough open upwardly and extending in the general direction of the incoming air flow from near the air inlet for substantially the entire length of the device, said trough being narrow in comparison with the lateral width of the device, and a drain outlet at the lower end of said trough.

4. The arrangement of claim 3 in which said trough is channel-shaped.

5. The arrangement of claim 3 in which the width of said trough is substantially less than one-tenth of the width of said device.

6. In a bleed water arrangement for a forced draft evaporative cooling device having an air inlet on one end of the device between the zones of water dispersal and collection, comprising, a trough mounted within said device between the zones of dispersal and collection of water, said trough open upwardly and having a cross-section for catching and conducting water, said trough extending in the general direction of the incoming air flow from near the air inlet for substantially the entire length of the device beneath the zone of water dispersal, said trough inclined downwardly at a small angle away from the air inlet for draining the water and protection from the incoming air, and a drain outlet at the lower end of said trough for receiving the water from said trough and disposing of such water.

7. In a bleed water arrangement in an evaporative cooling device, comprising, a housing having an air inlet in the side and a water collecting sump in the bottom, means for discharging air through said air inlet into said housing, heat exchange means provided in said housing including water spray means and occupying a horizontal zone located above said air inlet, a trough mounted in said housing below said heat exchange means and above said collecting sump, said trough having a narrow width and extending slightly downward away from said air inlet for substantially the extent of said heat exchange means for catching water therein, and a drain outlet communicating with the lower end of said trough for removing the water caught by the trough from the device.

8. In a bleed water arrangement in an evaporative cooling device, comprising, a housing, heat exchange means provided in said housing, means for spraying water over said heat exchange means, an air inlet in the side of said housing below the horizontal zone of said heat exchange means, means for discharging air through said air inlet into said housing in a longitudinal direction below said heat exchange means at varying rates, a trough mounted in said housing below said heat exchange means and extending slightly downward in said longitudinal direction for substantially the extent of said heat exchange means for catching water therein and conducting such water in said longitudinal direction, and a drain outlet communicating with the lower end of said trough for removing the water caught by the trough from the device.

9. The arrangement of claim 8 in which said trough is of a predetermined lateral width in proportion to the lateral width of said housing for catching that proportion of water as bleed water.

10. In a bleed water arrangement in an evaporative cooling device, comprising, a housing having an open top for air outlet and a closed bottom for water collection, heat exchange means provided in said housing and occupying a horizontal zone located and spaced above the collected water and below the open top, means for pumping said collected water to near said open top and spraying such water over said heat exchange means, an air inlet in the side of said housing below the horizontal zone of said heat exchange means and above the collected water, means for discharging air through said air inlet into said housing in a longitudinal direction below said heat exchange means and at substantially varying rates, a trough mounted in said housing below said heat exchange means and extending slightly downward and in said longitudinal direction for substantially the extent of said heat exchange means for catching water therein and conducting such water in said longitudinal direction, said trough of a predetermined lateral width in proportion to the lateral width of said housing for catching that proportion of circulating water as bleed water, and a drain outlet communicating with the lower end of said trough for removing the water caught by the trough and excess water from the bottom of said housing of the device.

11. In an improved bleed water arrangement in an evaporative cooling device having a housing with a heat exchange means provided in said housing and occupying a horizontal zone therein, means for recirculating said spraying water over said heat exchange means, an air inlet in the side of said housing below the horizontal zone of said heat exchange means, means for discharging air through said air inlet into said housing below said heat exchange means, and an overflow drain pipe in the bottom of said housing, the improvement comprising a trough mounted in said housing below said heat exchange means and extending slightly downward away from said air inlet for substantially the extent of said heat exchange means for catching water, said trough of a predetermined lateral width in proportion to the lateral width of said housing for catching substantially that proportion of circulating water as bleed water, and the lower end of said trough communicating with said drain pipe for removing the water caught by the trough from the device.

References Cited

UNITED STATES PATENTS

| | | | |
|---|---|---|---|
| 2,483,540 | 10/1949 | Henney | 62—305 |
| 2,570,247 | 10/1951 | Kals | 165—122 |
| 2,680,599 | 6/1954 | Wile | 62—305 |
| 2,817,960 | 12/1957 | Lustwerk | 62—305 |
| 2,859,766 | 11/1958 | Shuldener | 137—268 |
| 3,132,190 | 5/1964 | Engalitcheff | 62—305 |
| 3,148,516 | 9/1964 | Kals | 62—305 |

WILLIAM J. WYE, *Primary Examiner.*